(12) United States Patent
Tsunoda

(10) Patent No.: US 8,064,779 B2
(45) Date of Patent: Nov. 22, 2011

(54) RECEIVING APPARATUS

(75) Inventor: Yukito Tsunoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 727 days.

(21) Appl. No.: 11/984,425

(22) Filed: Nov. 16, 2007

(65) Prior Publication Data

US 2009/0022502 A1    Jan. 22, 2009

(30) Foreign Application Priority Data

Nov. 30, 2006   (JP) ................. 2006-322730

(51) Int. Cl.
H04B 10/06        (2006.01)

(52) U.S. Cl. ......... 398/202; 398/208; 398/209; 398/210

(58) Field of Classification Search .................. None
See application file for complete search history.

(56) References Cited

U.S. PATENT DOCUMENTS

| 5,475,342 | A | 12/1995 | Nakamura et al. | |
|---|---|---|---|---|
| 6,393,069 | B1 * | 5/2002 | Shibata | 375/340 |
| 6,694,105 | B2 * | 2/2004 | Chang et al. | 398/202 |
| 6,812,787 | B2 | 11/2004 | Kimura | |
| 2004/0190913 | A1 * | 9/2004 | Seo et al. | 398/202 |

FOREIGN PATENT DOCUMENTS

| JP | 6-310967 | 11/1994 |
|---|---|---|
| JP | 11-234349 | 8/1999 |

OTHER PUBLICATIONS

Patent Abstracts of Japan Pub. No. 2007-336223 published Dec. 27, 2007.
Patent Abstracts of Japan 06-310967 published Nov. 4, 1994.
Patent Abstracts of Japan 2003-215173 published Jul. 30, 2003.
Patent Abstracts of Japan 09-218225 published Aug. 19, 1997.
Patent Abstracts of Japan 2004-151055 published May 27, 2004.
Patent Abstracts of Japan 02-243967 published Sep. 28, 1990.
Patent Abstracts of Japan 2003-283310 published Oct. 3, 2003.
Patent Abstracts of Japan, Publication No. 11-234349, published Aug. 27, 1999.
Patent Abstracts of Japan, Publication No. 6-310967, published Nov. 4, 1994.
Japanese Office Action in Application No. 2006-322730, dated May 10, 2011.

* cited by examiner

*Primary Examiner* — Kenneth Vanderpuye
*Assistant Examiner* — Darren E Wolf
(74) *Attorney, Agent, or Firm* — Staas & Halsey LLP

(57) ABSTRACT

A receiving apparatus which suppresses threshold-voltage changes. A peak voltage detection block detects the peak voltage of a signal. A bottom voltage detection block detects the bottom voltage of the signal. A stop control block generates a stop signal for stopping the operations to detect the peak voltage and the bottom voltage. A threshold value specification block specifies a threshold voltage derived from the peak voltage and the bottom voltage. When receiving the stop signal, the peak voltage detection block stops the operation to detect the peak voltage and retains the peak voltage detected before the reception of the stop signal while the same signal is being received. When receiving the stop signal, the bottom voltage detection block stops the operation to detect the bottom voltage and retains the bottom voltage detected before the reception of the stop signal while the same signal is being received.

4 Claims, 17 Drawing Sheets

RECEIVING APPARATUS

CROSS-REFERENCE TO RELATED APPLICATIONS

This application is based upon and claims the benefits of priority from the prior Japanese Patent Application No. 2006-322730, filed Nov. 30, 2006, the entire contents of which are incorporated herein by reference.

BACKGROUND OF THE INVENTION

1. Field of the Invention

The present invention relates to receiving apparatuses, and particularly to a receiving apparatus that performs reception processing of input packets sent in a burst.

2. Description of the Related Art

The proliferation of the Internet has spread the use of information communications networks among households and businesses in recent years. The progression of optical fiber subscriber networks toward higher-speed and higher-capacity services has encouraged the widespread adoption of a passive optical network (PON) system as an optical fiber subscriber system.

FIG. 14 shows the configuration of such a PON system 5. The PON system 5 includes an optical line terminal (OLT) 51 located on the side of a local exchange, optical network units (ONUs) #1 to #n disposed on the subscriber side, and a star coupler 52 for coupling and decoupling an optical signal.

The star coupler 52 makes a one-to-n connection between the OLT 51 and the ONUs #1 to #n with optical fiber cables F and allows optical packet communication between the OLT 51 and the ONUs #1 to #n. In the figure, the star coupler 52 couples optical packets sent in a burst from the ONUs #1 to #n of a plurality of subscribers, and the single OLT 51 receives those packets.

FIG. 15 is a view showing the levels of a signal received by the OLT 51. The horizontal axis represents time, and the vertical axis represents the level of the electrical signal after optical-electric conversion. The ONUs #1 to #n are placed in individual subscribers' homes. The transmission distance between the OLT 51 and the ONU varies among the ONUs #1 to #n, so the OLT 51 turns out to receive packet signals of different levels.

Each time a packet is received from each ONU, the OLT 51 specifies a threshold level for recognizing the code, judges whether the code is '1' or '0' in accordance with the threshold value, and performs data reception processing for the packet. In the shown example, the ONU #1 is the farthest from the OLT 51, and the ONU #5 is the closest.

In one conventional reception control technology (disclosed in Japanese Unexamined Patent Application Publication No. Hei-06-310967), a peak value and a bottom value detected from the input signal waveform are retained, a middle value between the two values is specified as a threshold value, and the input signal is amplified in a linear range having the threshold value at its center while a constant output amplitude is kept.

The OLT 51 includes a packet reception circuit. This circuit detects the peak voltage (voltage when the signal is high) and the bottom voltage (voltage when the signal is low) of a received packet and obtains a threshold value.

FIG. 16 is a view showing an overview of the packet reception processing. The horizontal axis represents time, and the vertical axis represents the signal level. Before the packet reception circuit receives a packet, the peak voltage, bottom voltage, and threshold voltage of the signal are reset. Then, the levels of peak voltage and bottom voltage of a received packet are detected from the level of the preamble (data indicating the position of the beginning of the packet) added to the first field of the received packet.

A midway level between the detected peak voltage and bottom voltage is obtained as the threshold voltage. After the reception of the packet ends, the peak voltage, bottom voltage, and threshold voltage are reset in preparation for the detection of the threshold value of a subsequent packet. This operation is performed for individual packets in the order in which they arrive, in the reception processing of a burst signal having input levels varying from packet to packet.

In the conventional packet reception circuit described above, even if the direct-current level does not vary during the input of the packet, the peak voltage and bottom voltage vary with the signal pattern of the input packet (data pattern of the packet), making it impossible to specify an accurate, constant threshold level.

FIG. 17 is a view illustrating the problem. The horizontal axis represents time, and the vertical axis represents the signal level. After the threshold level of a packet p1 is established, the detected levels are reset, and a packet p2 is received. As a first step for specifying a threshold level for the packet p2, the levels of the peak voltage and bottom voltage of the packet p2 are detected from the level of the preamble. Although the direct-current signal level of the input packet is constant during the input of the packet p2, the detected peak voltage and bottom voltage vary with the pattern of the input signal.

Since the threshold voltage depends on the varying peak voltage and bottom voltage (the figure shows that the peak voltage increases and decreases even though the input voltage of the packet p2 is constant), the threshold voltage varies while the same packet is being received. Therefore, a correct threshold value for judging the code cannot be specified.

SUMMARY OF THE INVENTION

In view of the foregoing, it is an object of the present invention to provide a receiving apparatus that prevents the peak voltage and bottom voltage of an input packet from varying with a change depending on the input signal pattern and specifies a constant threshold voltage.

To accomplish the above object, according to the present invention, there is provided a receiving apparatus for performing reception processing of a signal transmitted in packets. This receiving apparatus includes the following elements: a peak voltage detection block for detecting a peak voltage of the signal; a bottom voltage detection block for detecting a bottom voltage of the signal; a stop control block for generating a stop signal for stopping the operation to detect the peak voltage and the operation to detect the bottom voltage; and a threshold value specification block for specifying a threshold voltage derived from the peak voltage and the bottom voltage. The peak voltage detection block stops the operation to detect the peak voltage at the reception of the stop signal, and retains the peak voltage detected before the reception of the stop signal while the same signal is being received. The bottom voltage detection block stops the operation to detect the bottom voltage at the reception of the stop signal, and retains the bottom voltage detected before the reception of the stop signal while the same signal is being received. The threshold value specification block specifies the threshold voltage derived from the peak voltage and the bottom voltage kept constant while the same signal is being received.

The above and other objects, features and advantages of the present invention will become apparent from the following

DESCRIPTION OF THE PREFERRED EMBODIMENTS

Figure 1:
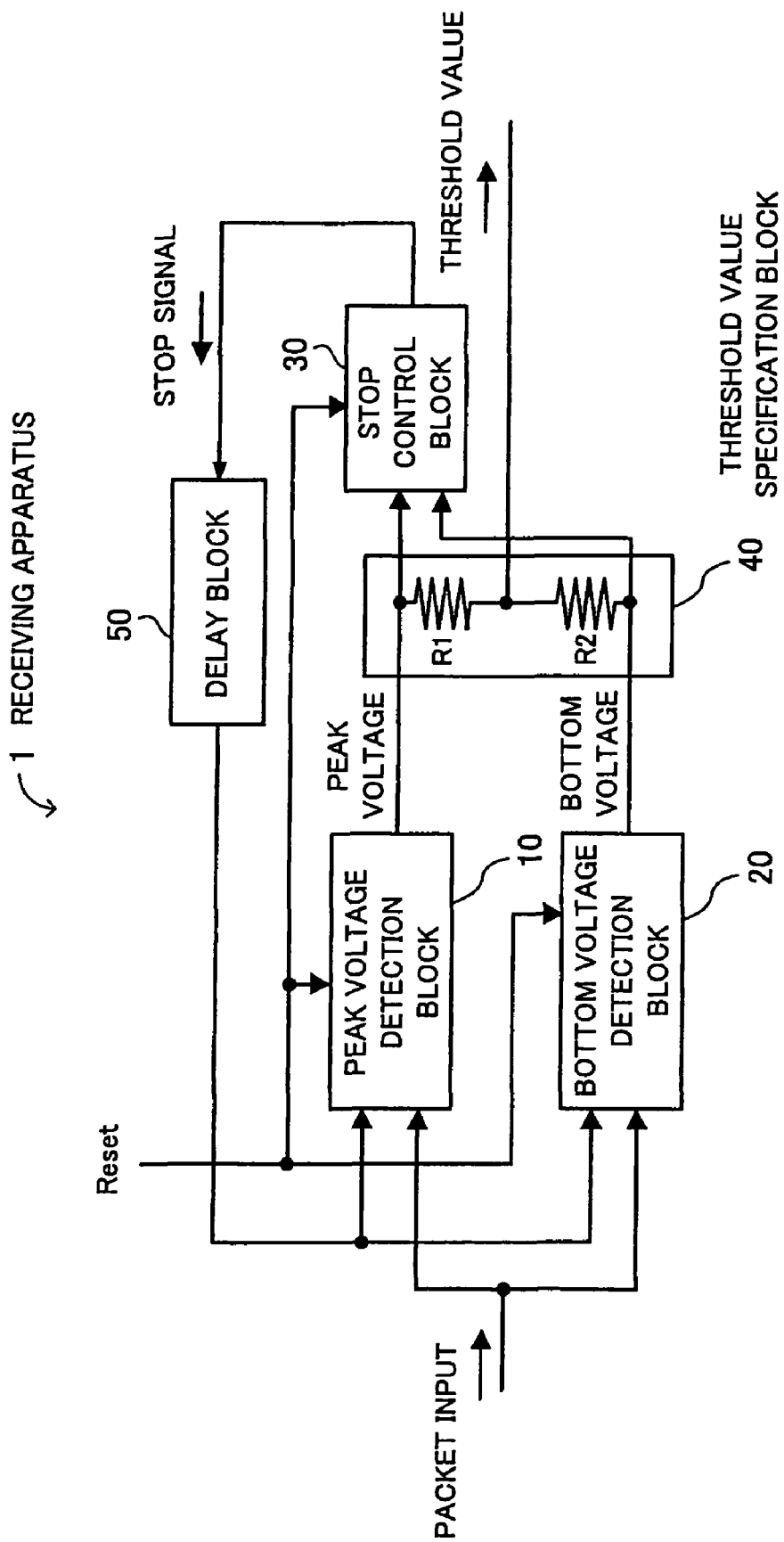
FIG. 1 is a diagram showing the principle of a receiving apparatus according to an embodiment of the present invention.

An embodiment of the present invention will be described below with reference to the drawings. FIG. 1 is a diagram showing the principle of a receiving apparatus 1 according to an embodiment of the present invention. The receiving apparatus 1 performs reception processing for packets sent in a burst and can be applied to a packet reception circuit in an OLT of a PON system used as an optical access system, for instance.

The receiving apparatus 1 includes a peak voltage detection block 10, a bottom voltage detection block 20, a stop control block 30, a threshold value specification block 40, and a delay block 50. The peak voltage detection block 10 follows the amplitude level of a packet and detects its peak voltage. The bottom voltage detection block 20 follows the amplitude level of the packet and detects its bottom voltage.

The stop control block 30 generates and outputs a stop signal for stopping the operation to detect the peak voltage and the operation to detect the bottom voltage. The threshold value specification block 40 includes resistors R1 and R2, divides the voltage by the resistors, and specifies a midway level between the peak voltage and the bottom voltage as a threshold voltage. The delay block 50 delays the stop signal for a predetermined period of time and sends the delayed signal to the peak voltage detection block 10 and the bottom voltage detection block 20 (the delay block 50 will be described later with reference to FIG. 6).

When receiving the stop signal, the peak voltage detection block 10 stops the operation to detect the peak voltage, and retains and outputs the peak voltage detected before the reception of the stop signal while the same packet is being received. When receiving the stop signal, the bottom voltage detection block 20 also stops the operation to detect the bottom voltage, and retains and outputs the bottom voltage detected before the reception of the stop signal while the same packet is being received. The threshold value specification block 40 specifies a threshold value derived from the constant peak voltage and bottom voltage kept while the same packet is being received.

When the processing to specify the threshold value for a single received packet is completed, a reset signal is given from the outside to the peak voltage detection block 10, the bottom voltage detection block 20, and the stop control block 30. This resets the peak voltage, the bottom voltage, the threshold voltage, and the stop signal, in preparation for specifying the threshold level of a packet arriving next.

Figure 2:
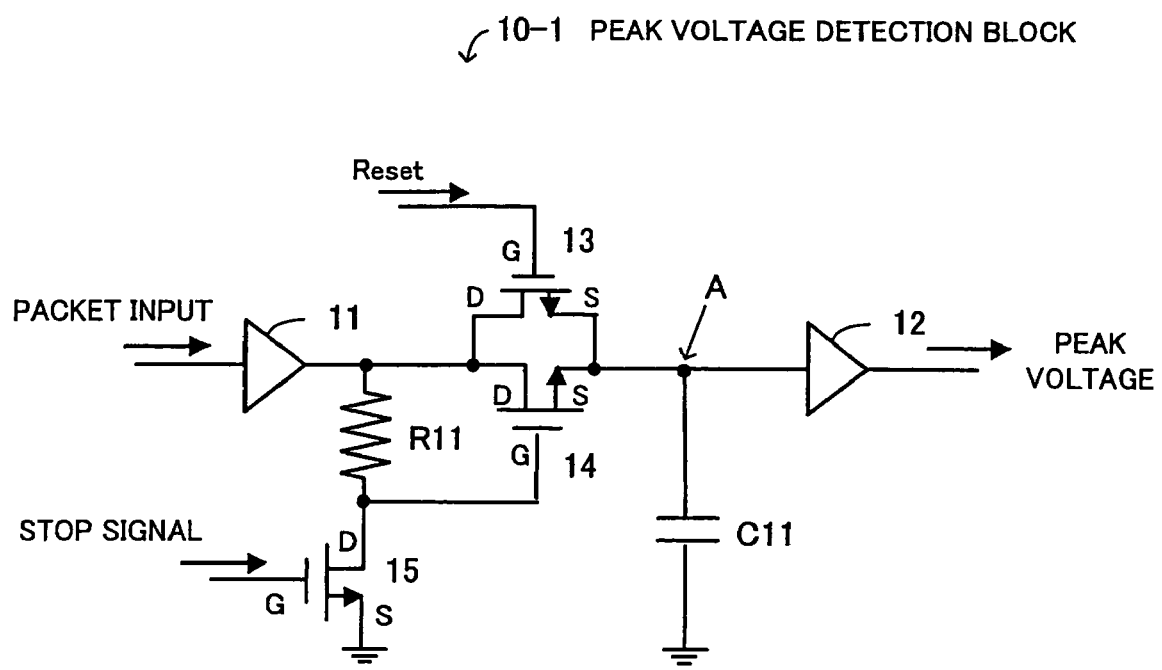
FIG. 2 is a diagram showing the configuration of a peak voltage detection block.

The configuration of the peak voltage detection block 10 will be described next. FIG. 2 is a diagram showing the configuration of an example peak voltage detection block 10-1. The peak voltage detection block 10-1 includes amplifiers 11 and 12, N-channel field effect transistors (FETs) 13 to 15, a resistor R11, and a capacitor C11.

The elements are connected as follows: The amplifier 11 has an input terminal receiving an input packet signal and an output terminal connected to one end of the resistor R11 and the drains of the FETs 13 and 14. The FET 15 has its gate receiving the stop signal, its drain connected to both the other end of the resistor R11 and the gate of the FET 14, and its source connected to the ground.

The FET 13 has its gate receiving the reset signal and its source connected the source of the FET 14, one end of the capacitor C11, and the input terminal of the amplifier 12. The other end of the capacitor C11 is connected to the ground, and the output terminal of the amplifier 12 outputs a peak voltage signal.

The peak voltage detection block 10-1 has a function to suppress a change in peak voltage by means of the stop signal while the same packet is being received. The basic operation to detect the peak voltage will be described first.

After a reset prior to packet input, the amplifier 11 amplifies the input signal and drives the gate of the FET 14 to pass the input signal. The peak voltage of the packet being input is detected by charging the capacitor C11 in accordance with the level of the input signal.

The potential at point A in the figure corresponds to the peak voltage to be detected. If the potential of the input signal at point A is higher than the currently retained potential, the FET 14 is turned on and current flows from its drain to its source. The capacitor C11 is charged and holds the higher level as the latest peak voltage. If the potential of the input signal at point A is lower than the currently retained potential, the FET 14 is off, and the capacitor C11 keeps retaining the current potential as the peak voltage.

In the peak voltage detection operation, the peak voltage is continuously detected by following the amplitude level of the input signal, as described above. Even though the amplitude level of a single packet should be constant, the detection operation alone cannot prevent the peak voltage from being varied during the reception of the packet because the input signal of the packet sent through the transmission path can have any signal pattern. If a continuous signal of the high level ('1') is received, for example, a leak current occurs between the drain and source of the FET 14 to charge the capacitor C11 additionally.

The operation to suppress a change in peak voltage by the peak voltage detection block 10-1 will next be described. When the stop signal generated by the stop control block 30 is input to the gate of the FET 15, the FET 15 is turned on and current flows to the resistor R11. (The stop signal is active-high, meaning that the signal stops the level detection operation when the signal is high.)

Then, the gate voltage of the FET 14 decreases (becomes low), the FET 14 is turned off, and current flowing from its drain to its source is stopped.

Figure 3:
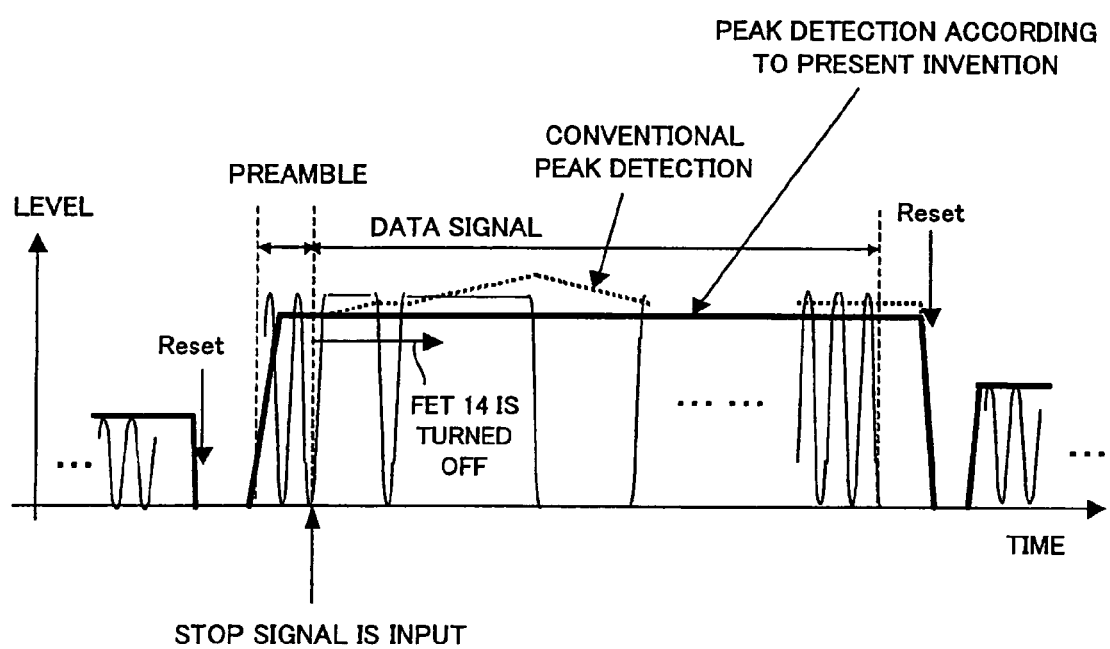
FIG. 3 is a view showing a peak voltage output from the peak voltage detection block.

FIG. 3 is a view showing the peak voltage output from the peak voltage detection block 10-1. The horizontal axis represents time, and the vertical axis represents the signal level. As shown in the figure, when the stop signal is received, a leak current between the drain and the source of the FET 14 is suppressed regardless of a change in the amplitude level of the input packet, and the capacitor C11 will not be charged additionally. Accordingly, while the same packet is being received, the constant peak voltage can be retained and output.

Figure 4:
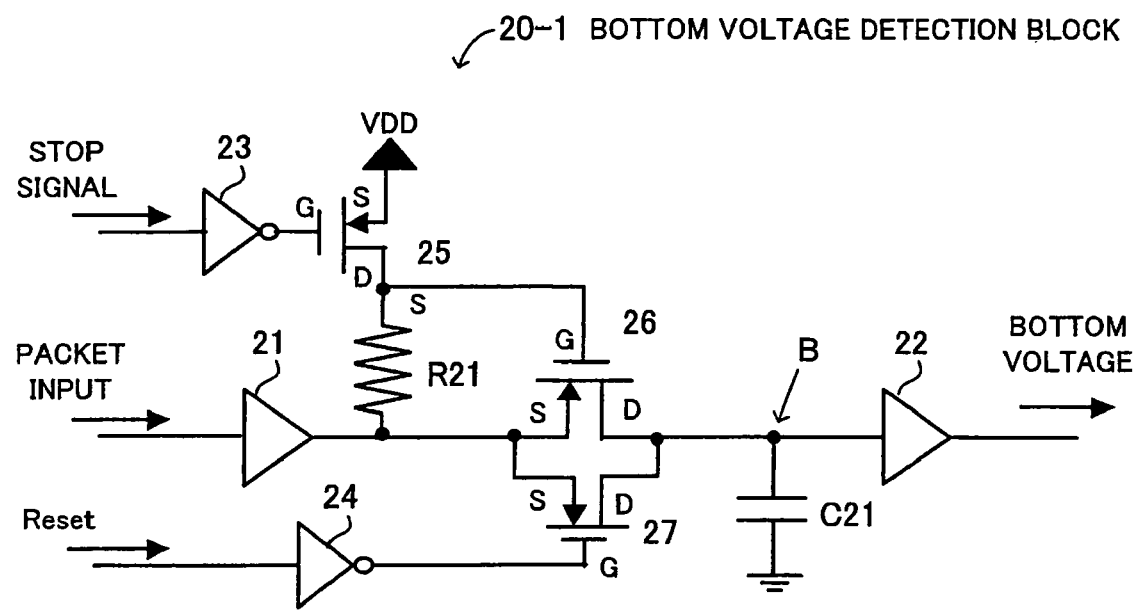
FIG. 4 is a diagram showing the configuration of a bottom voltage detection block.

The configuration of the bottom voltage detection block 20 will next be described. FIG. 4 is a diagram showing the configuration of an example bottom voltage detection block 20-1. The bottom voltage detection block 20-1 includes amplifiers 21 and 22, inverter gates 23 and 24, P-channel FETs 25 to 27, a resistor R21, and a capacitor C21.

The elements are connected as follows: The inverter gate 23 has an input terminal receiving the input stop signal and an output terminal connected to the gate of the FET 25. The FET 25 has its source connected to the power supply voltage VDD and its drain connected to one end of the resistor R21 and the gate of the FET 26. The amplifier 21 has an input terminal receiving the input packet signal and an output terminal connected to the other end of the resistor R21 and the sources of the FETs 26 and 27. The inverter gate 24 has an input terminal receiving the input reset signal and an output terminal connected to the gate of the FET 27. The FET 26 has its drain connected to the drain of the FET 27, one end of the capacitor C21, and the input terminal of the amplifier 22. The other end of the capacitor C21 is connected to the ground. The output terminal of the amplifier 22 outputs the bottom voltage signal.

The bottom voltage detection block 20-1 is configured with the diodes of the FETs in the peak voltage detection block 10-1 inverted and detects the bottom voltage. In this operation, the potential at point B shown in the figure corresponds to the bottom voltage to be detected. If the potential of the input voltage at point B is lower than the currently retained potential, the FET 26 is turned on and current flows from its source to its drain. This charges the capacitor C21, and the lower level is retained as the latest bottom voltage. If the potential of the input signal is higher than the currently retained potential, the FET 26 is off, and the capacitor C21 keeps retaining the current potential as the bottom voltage.

In the operation to suppress a change in the bottom voltage, the stop signal generated by the stop control block 30 is received and input to the inverter gate 23, where the stop signal is inverted and input to the gate of the FET 25. This turns on the FET 25 and current flows from the source to the drain, and the current is supplied to the gate of the FET 26. Because the gate voltage level of the FET 26 becomes high, the FET 26 is turned off and stops the flow of current from the source to the drain.

Accordingly, when the stop signal is received, the leak current between the source and drain of the FET 26 is suppressed regardless of a change in the amplitude level of the input packet, and the capacitor C21 will not be charged additionally. Therefore, the constant bottom voltage can be retained and output while the same packet is being received.

Figure 5:
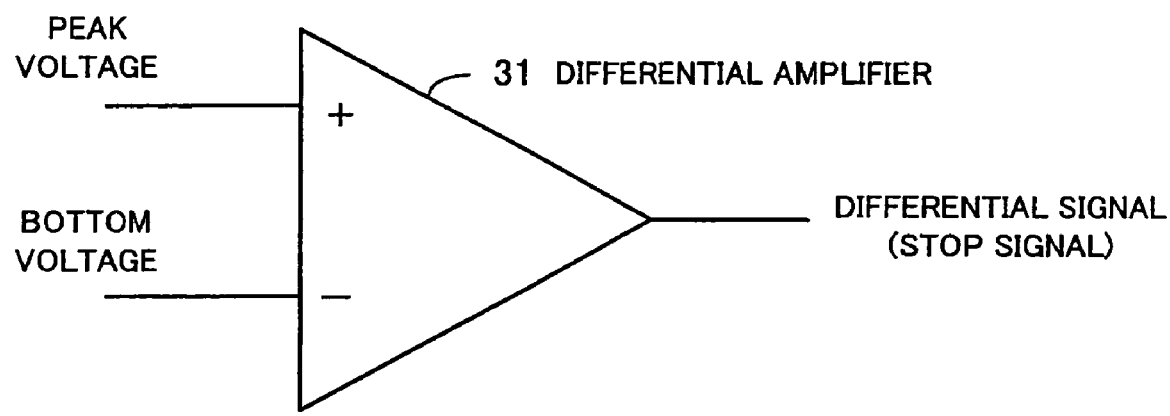
FIG. 5 is a diagram showing the configuration of a stop control block.

The stop control block 30 will be described next. FIG. 5 is a diagram showing the configuration of the stop control block 30. The stop control block 30 can be configured most simply by a single differential amplifier 31. The peak voltage detected by the peak voltage detection block 10 is input to a first input terminal of the differential amplifier 31, and the bottom voltage detected by the bottom voltage detection block 20 is input to a second input terminal of the differential amplifier 31. The difference between the peak voltage and the bottom voltage is output as the stop signal.

The peak voltage input to the first input terminal of the differential amplifier 31 is detected from the amplitude level of the preamble placed in the first field of the packet, by the peak voltage detection block 10. The bottom voltage input to the second input terminal of the differential amplifier 31 is detected from the amplitude level of the preamble placed in the first field of the packet, by the bottom voltage detection block 20.

In other words, the differential amplifier 31 detects the amplitude level between the peak and bottom in the preamble section of the input packet. When the amplitude level of the input packet is detected, the result of detection is sent back to the peak voltage detection block 10 and the bottom voltage detection block 20 as the stop signal.

When receiving the stop signal, the peak voltage detection block 10 retains the peak voltage detected before the reception of the stop signal, that is, the peak voltage detected from the preamble of the input packet, while the same packet is being received. When receiving the stop signal, the bottom voltage detection block 20 retains the bottom voltage detected before the reception of the stop signal, that is, the bottom voltage detected from the preamble of the input packet while the same packet is being received.

The threshold value specification block 40 specifies the threshold value derived from the peak voltage and the bottom voltage kept constant while the same packet is being received, by dividing the difference between the voltages by the resistors R1 and R2. Since a change in threshold value has been suppressed, the code in the packet can be judged with high precision by using the threshold level in subsequent processing.

The delay block 50 will be described next. The delay block 50 is a circuit for adjusting the input time at which the stop signal is input to the peak voltage detection block 10 and the bottom voltage detection block 20.

Figure 6:
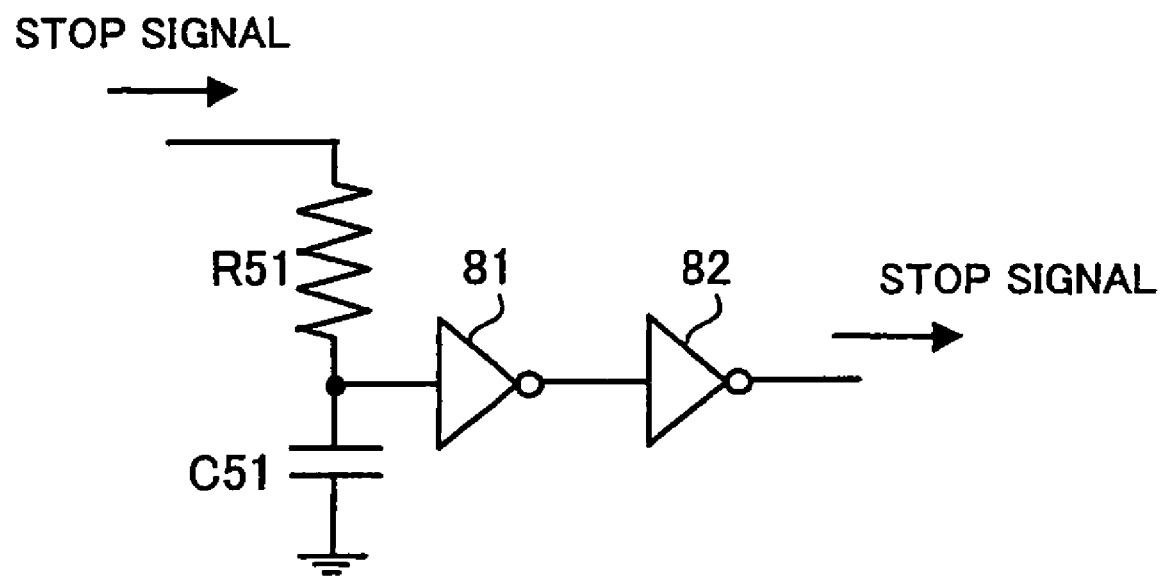
FIG. 6 is a diagram showing the configuration of a delay block.

FIG. 6 is a diagram showing the configuration of the delay block 50. The delay block 50 includes inverter gates 81 and 82, a resistor R51, and a capacitor C51. The stop signal is input to one end of the resistor R51, and the other end of the resistor R51 is connected to the input terminal of the inverter gate 81 and one end of the capacitor C51. The other end of the capacitor C51 is connected to the ground, and the output terminal of the inverter gate 81 is connected to the input terminal of the inverter gate 82. The output terminal of the inverter gate 82 outputs the stop signal.

When the stop signal is input, the capacitor C51 is charged. After the charging ends, the signal is rectified and output by the inverter gates 81 and 82. Therefore, the signal is delayed by about the period of charging of the capacitor C51.

Figure 7:
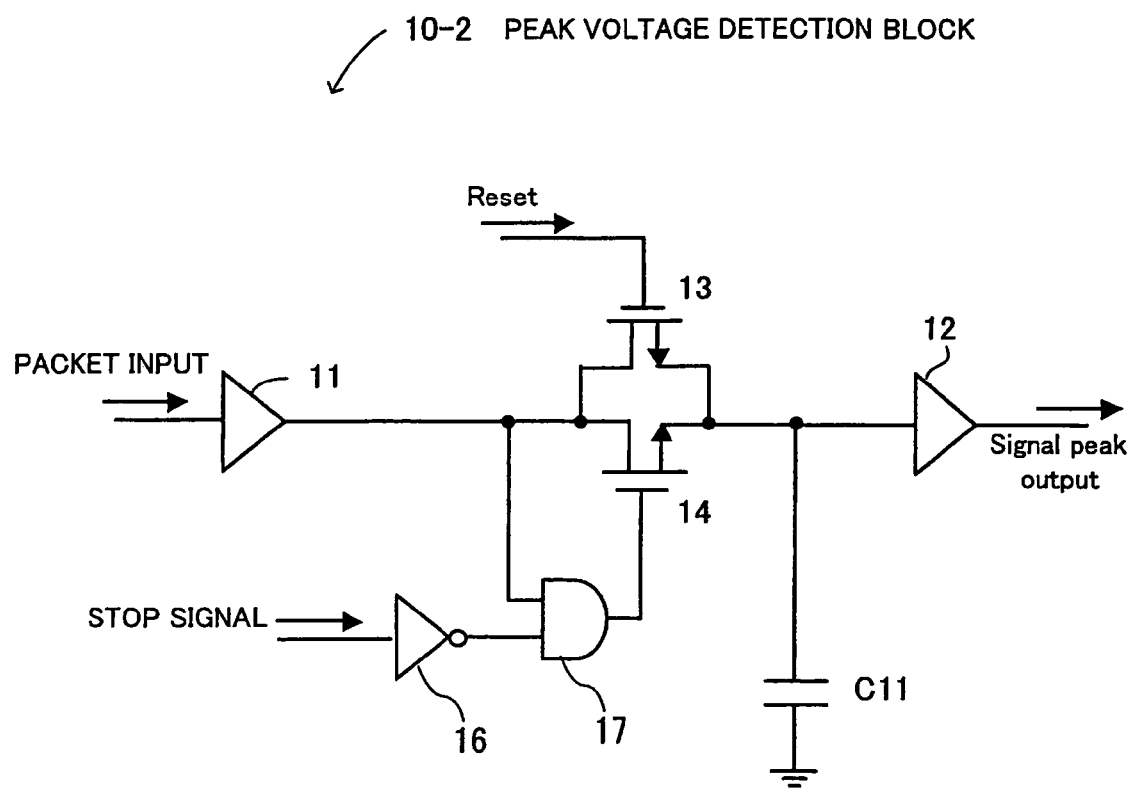
FIG. 7 is a diagram showing the configuration of another peak voltage detection block.

FIG. 7 is a diagram showing the configuration of another peak voltage detection block 10-2. The peak voltage detection block 10-2 includes amplifiers 11 and 12, N-channel FETs 13 and 14, a capacitor C11, an inverter gate 16, and a two-input-one-output AND gate 17.

The elements are connected as follows: The amplifier 11 has an input terminal receiving the input packet signal and an output terminal connected to one input terminal of the AND gate 17 and the drains of the FETs 13 and 14. The inverter gate 16 has an input terminal receiving the input stop signal and an output terminal connected to another input terminal of the AND gate 17.

The FET 13 has its gate receiving the reset signal. The AND gate 17 has an output terminal connected to the gate of the FET 14. The FET 13 has its source connected to the source of the FET 14, one end of the capacitor C11, and the input terminal of the amplifier 12. The other end of the capacitor C11 is connected to the ground. The output terminal of the amplifier 12 outputs the peak voltage signal.

In the operation to suppress a change in peak voltage performed by the peak voltage detection block 10-2, when the stop signal is received, the stop signal is input to the inverter gate 16 and inverted, and the low signal is input from the AND gate 17 to the gate of the FET 14. Because the gate voltage of the FET 14 becomes low, the FET 14 turns off and stops the peak voltage detection operation.

The FET 14 is turned on and the peak voltage is detected only when the following conditions are satisfied: a packet is input; the output from the amplifier 11 is high; the stop signal is low; and the output of the inverter gate 16 is high. Otherwise, the FET 14 is turned off, and the capacitor C11 is not charged.

Figure 8:
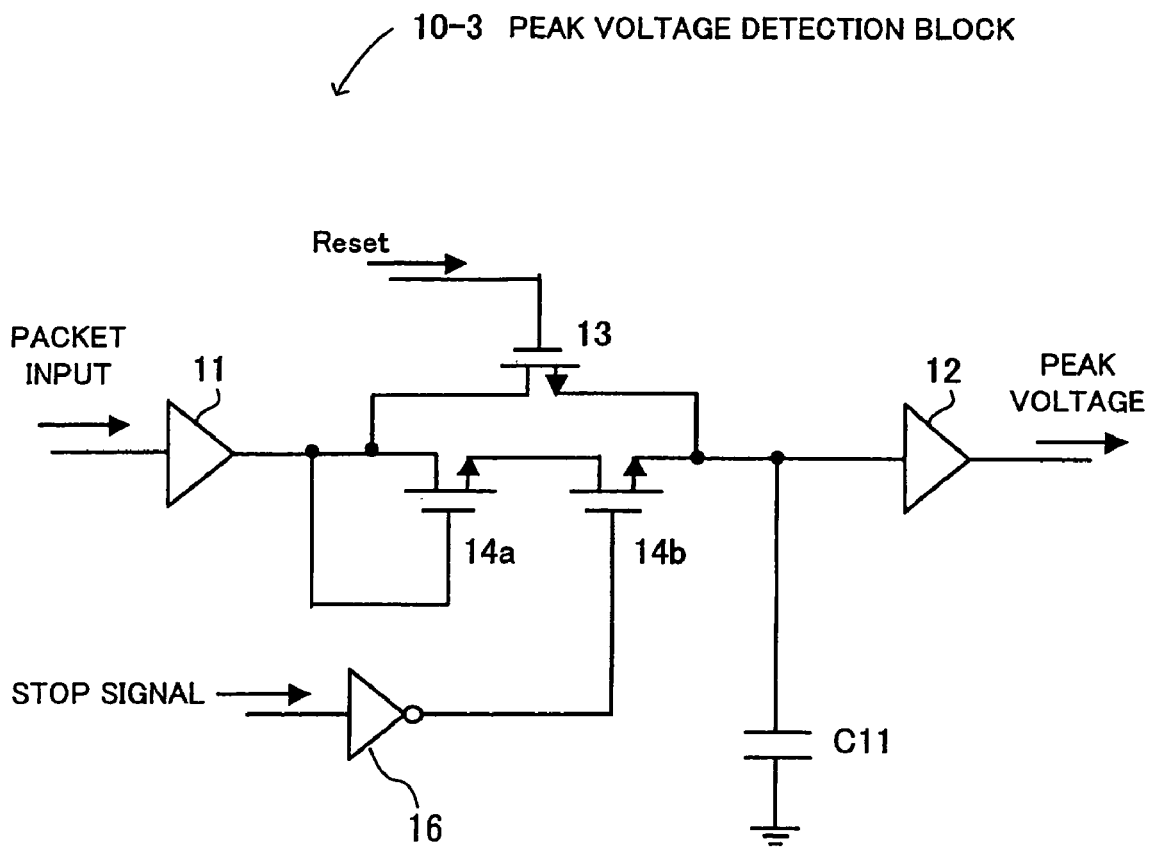
FIG. 8 is a diagram showing the configuration of still another peak voltage detection block.

FIG. 8 is a diagram showing the configuration of still another peak voltage detection block 10-3. The peak voltage detection block 10-3 includes amplifiers 11 and 12, N-channel FETs 13, 14a, and 14b, a capacitor C11, and an inverter gate 16.

The elements are connected as follows: The amplifier 11 has an input terminal receiving the input packet signal and an output terminal connected to the drains of the FETs 13 and 14a and the gate of the FET 14a. The inverter gate 16 has an input terminal receiving the input stop signal and an output terminal connected to the gate of the FET 14b. The FET 13 has its gate receiving the reset signal. The FET 14a has its source connected to the drain of the FET 14b. The FET 13 has its source connected to the source of the FET 14b, one end of the capacitor C11, and the input terminal of the amplifier 12. The other end of the capacitor C11 is connected to the ground. The output terminal of the amplifier 12 outputs the peak voltage signal.

In the operation to suppress a change in peak voltage performed by the peak voltage detection block 10-3, when the stop signal is received, the input stop signal is inverted by the inverter gate 16, and the low signal is input to the gate of the FET 14b. Because the gate voltage of the FET 14b is low, the FET 14b turns off and stops the peak voltage detection operation.

The FET 14a is turned on when the following conditions are satisfied: a packet is input; and the output from the amplifier 11 is high. The FET 14b is turned on when the following conditions are satisfied further: the stop signal is low, and the output from the inverter gate 16 is high. Only when the FETs 14a and 14b are turned on, current flows through the FETs 14a and 14b to the capacitor C11, and the peak voltage is detected. Otherwise, the capacitor C11 is not charged.

Figure 9:
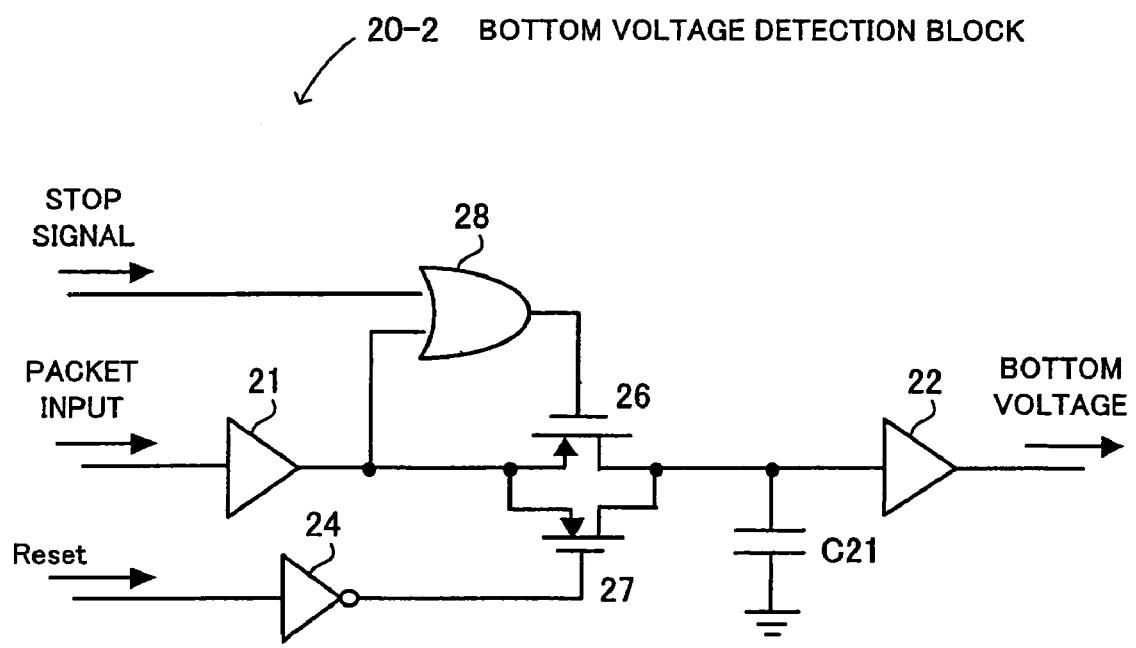
FIG. 9 is a diagram showing the configuration of another bottom voltage detection block.

FIG. 9 is a diagram showing the configuration of another bottom voltage detection block 20-2. The bottom voltage detection block 20-2 includes amplifiers 21 and 22, P-channel FETs 26 and 27, a capacitor C21, an inverter gate 24, and a two-input-one-output OR gate 28.

The elements are connected as follows: The amplifier 21 has an input terminal receiving the input packet signal and an output terminal connected to one input terminal of the OR gate 28 and the sources of the FETs 26 and 27. The OR gate 28 has another input terminal receiving the input stop signal and an output terminal connected to the gate of the FET 26. The inverter gate 24 has an input terminal receiving the input reset signal and an output terminal connected to the gate of the FET 27. The FET 26 has its drain connected to the drain of the FET 27, one end of the capacitor C21, and the input terminal of the amplifier 22. The other end of the capacitor C21 is connected to the ground. The output terminal of the amplifier 22 outputs the bottom voltage signal.

In the operation to suppress a change in bottom voltage, when the stop signal is received, the OR gate 28 outputs a high signal to the gate of the FET 26. The FET 26 turns off and stops the bottom voltage detection operation.

The output of the OR gate 28 goes low only when the following conditions are satisfied: A packet is input; the output from the amplifier 21 is low; and the stop signal is low. The low output of the OR gate 28 turns on the FET 26 to detect the bottom voltage. Otherwise, the capacitor C21 is not charged.

Figure 10:
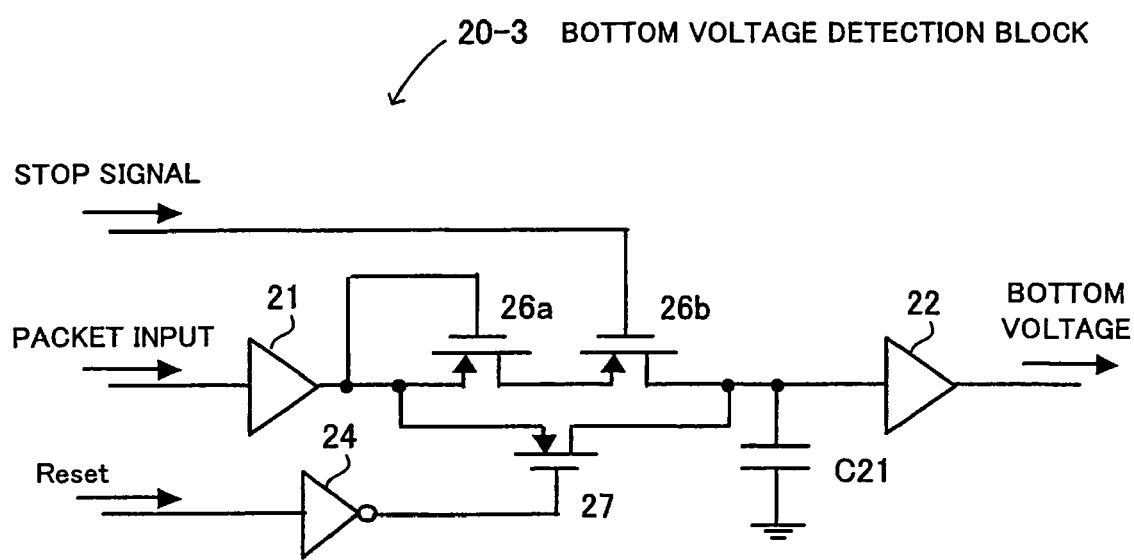
FIG. 10 is a diagram showing the configuration of still another bottom voltage detection block.

FIG. 10 is a diagram showing the configuration of still another bottom voltage detection block 20-3. The bottom voltage detection block 20-3 includes amplifiers 21 and 22, P-channel FETs 26a, 26b, and 27, a capacitor C21, and an inverter gate 24.

The elements are connected as follows: The amplifier 21 has an input terminal receiving the input packet signal and an output terminal connected to the sources of the FETs 27 and 26a and the gate of the FET 26a. The inverter gate 24 has an input terminal receiving the input reset signal and an output terminal connected to the gate of the FET 27. The FET 26b has its gate receiving the stop signal, its source connected to the drain of the FET 26a, and its drain connected to the drain of the FET 27, one end of the capacitor C21, and the input terminal of the amplifier 22. The other end of the capacitor C21 is connected to the ground. The output terminal of the amplifier 22 outputs the bottom voltage signal.

In the operation to suppress a change in bottom voltage performed by the bottom voltage detection block 20-3, when the stop signal is received, the signal is input to the gate of the FET 26b. The high gate voltage of the FET 26b turns off the FET 26b and stops the bottom voltage detection operation.

When a packet is input and when the output from the amplifier 21 is low, the gate voltage of the FET 26a becomes low and turns on the FET 26a. When the stop signal is low in addition, the gate of the FET 26b becomes low and turns on the FET 26b. Only when the FETs 26a and 26b are turned on, current flows through the FETs 26a and 26b to the capacitor C21, and the bottom voltage is detected. Otherwise, the capacitor C21 is not charged.

Figure 11:
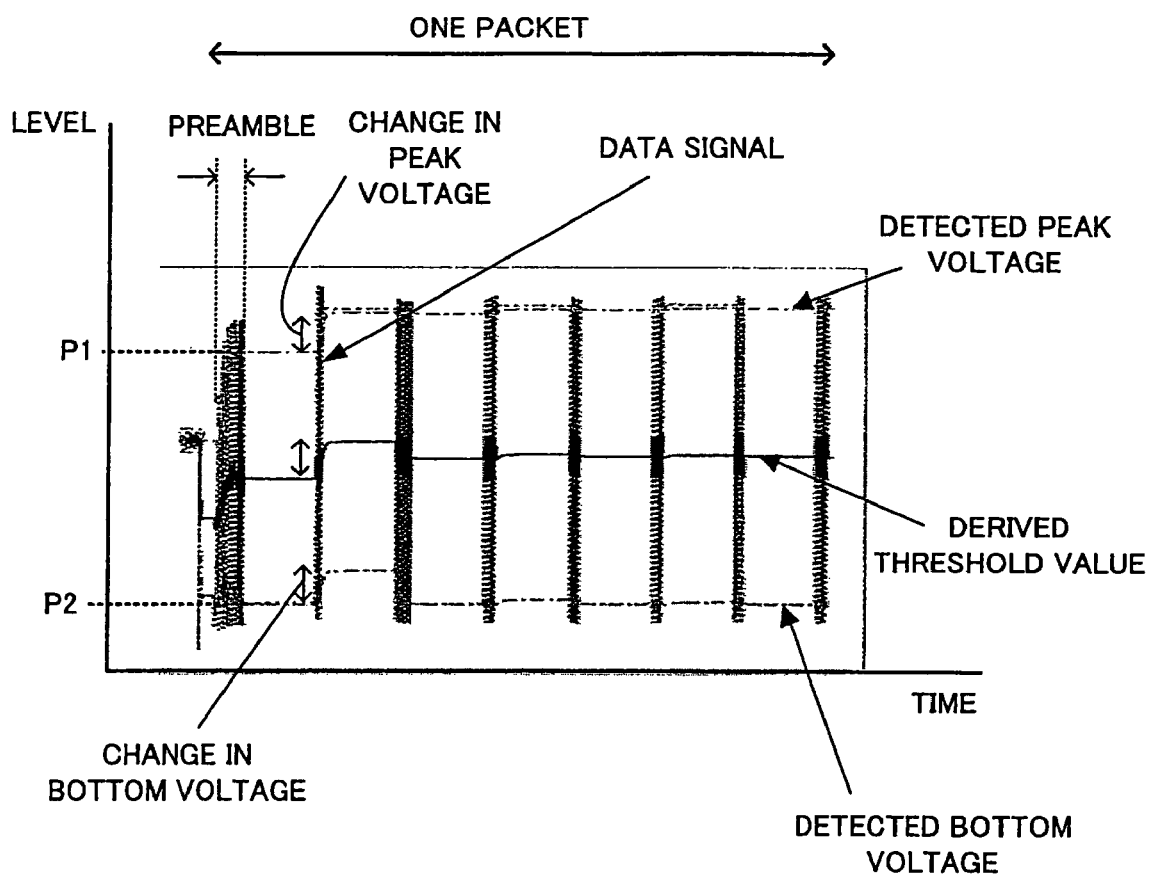
FIG. 11 is a view showing level characteristics of a peak voltage, a bottom voltage, and a threshold voltage.
Figure 12:
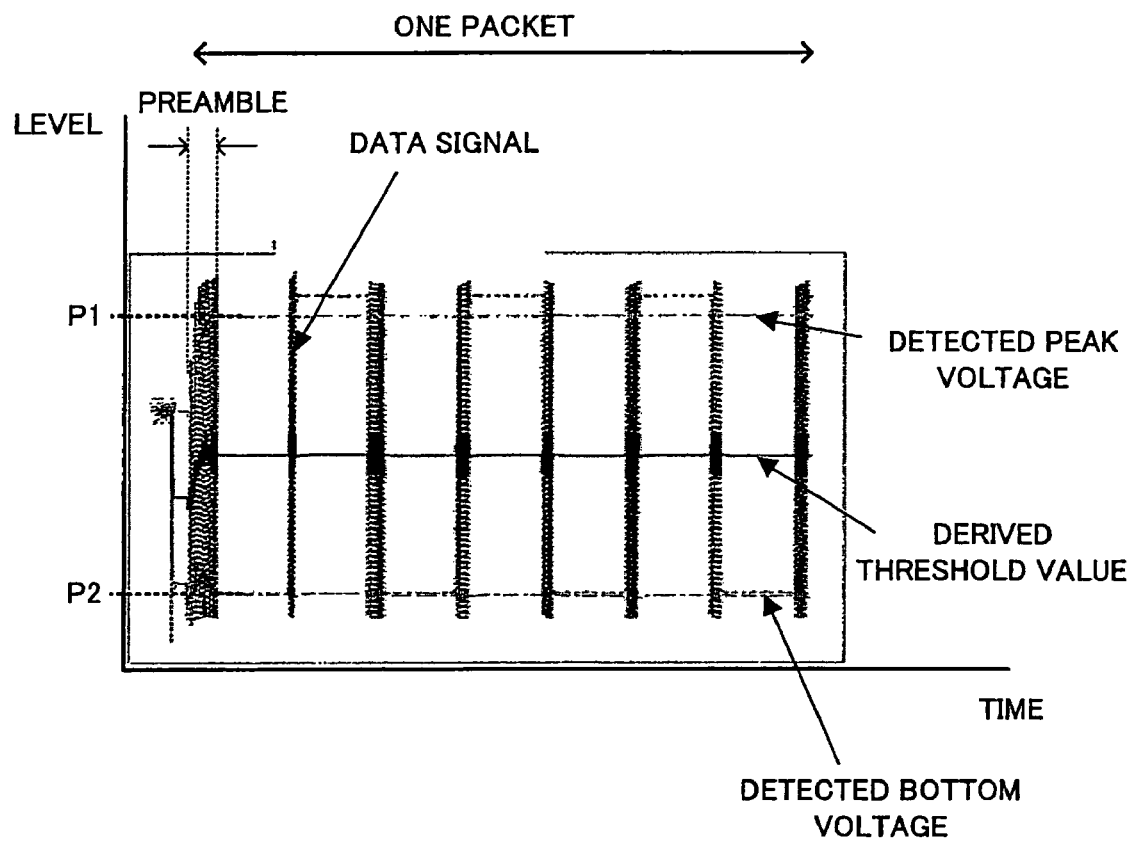
FIG. 12 is a view showing level characteristics of a peak voltage, a bottom voltage, and a threshold voltage.

Results of simulation of the receiving apparatus 1 will be described next. FIGS. 11 and 12 are views showing level characteristics of the peak voltage, the bottom voltage, and the threshold voltage. The horizontal axis represents time, and the vertical axis represents the signal level.

FIG. 11 is a view showing the level characteristics obtained in a conventional configuration. In a conventional apparatus not having the configuration of the present invention, a peak voltage P1 and a bottom voltage P2 are detected from the preamble, and the peak voltage and the bottom voltage vary with the input pattern of the packet data signal after the preamble. The threshold voltage varies accordingly while the same packet is being received.

FIG. 12 is a view showing the level characteristics of the receiving apparatus 1. In the receiving apparatus 1, a peak voltage P1 and a bottom voltage P2 are detected from the preamble. After the voltages are detected, the stop signal stops the operations to detect the peak voltage and the bottom voltage. The peak voltage P1 and the bottom voltage P2 detected from the preamble are kept while the same packet is being received (until the reset signal is given). Even if the amplitude of the packet data signal changes, the peak voltage and the bottom voltage will not vary with the change. Therefore, the threshold voltage is also kept constant while the same packet is being received.

Figure 13:
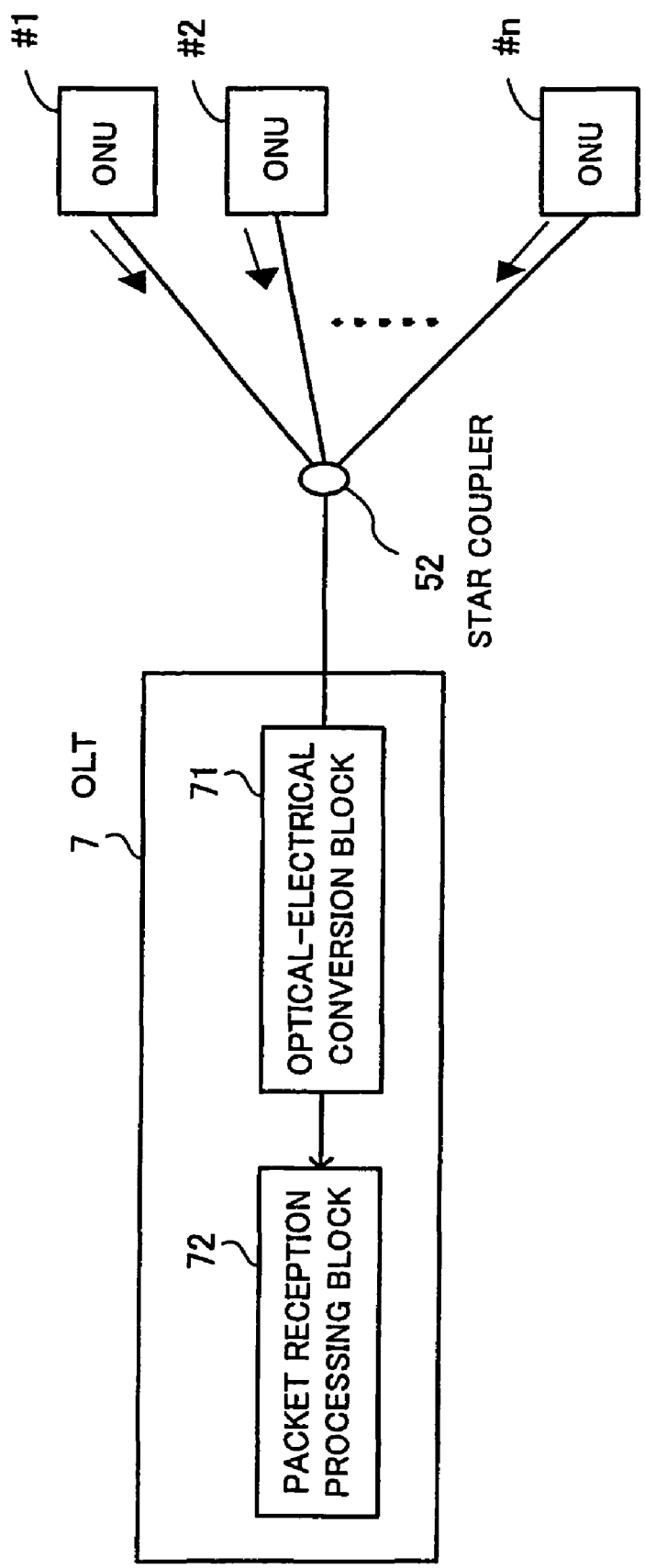
FIG. 13 is a diagram showing the configuration of an OLT.
Figure 14:
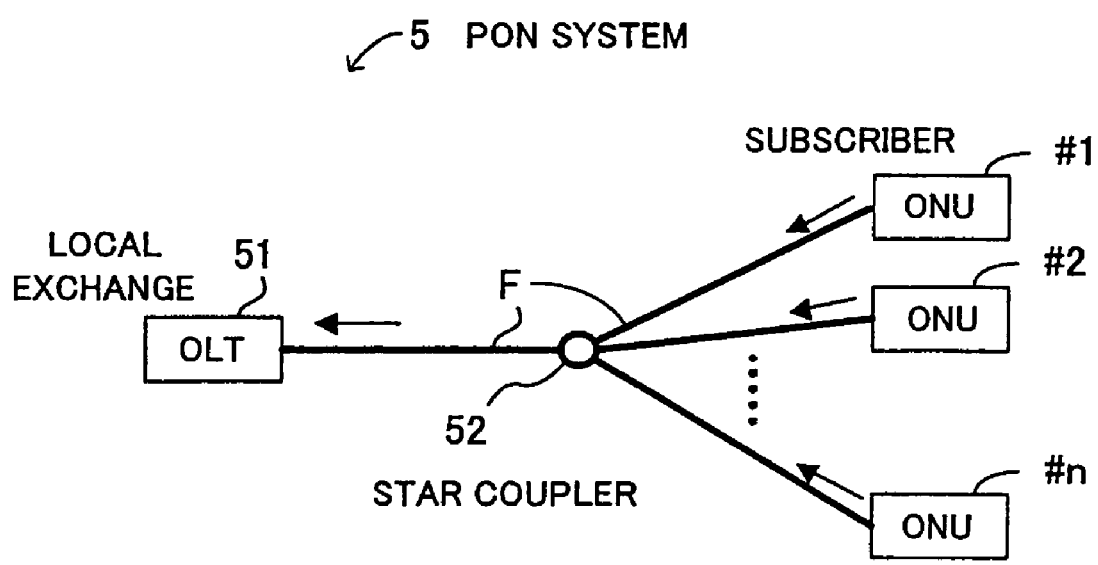
FIG. 14 is a diagram showing the configuration of a PON system.
Figure 15:
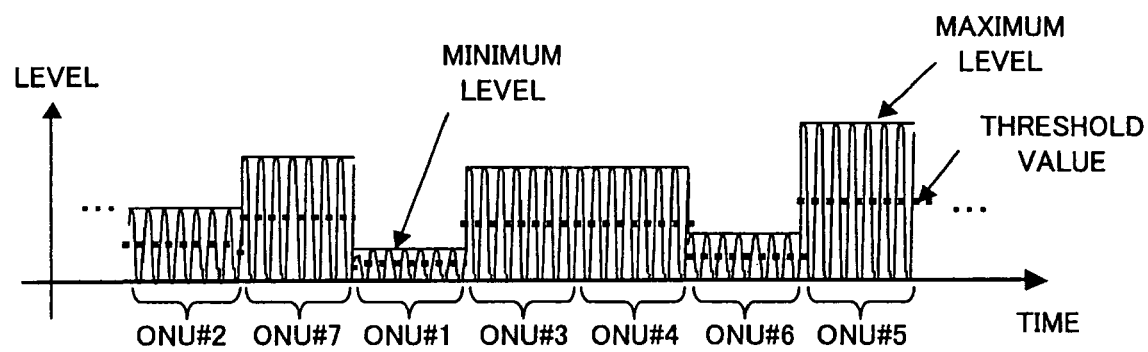
FIG. 15 is a view showing levels of a signal received by an OLT.
Figure 16:
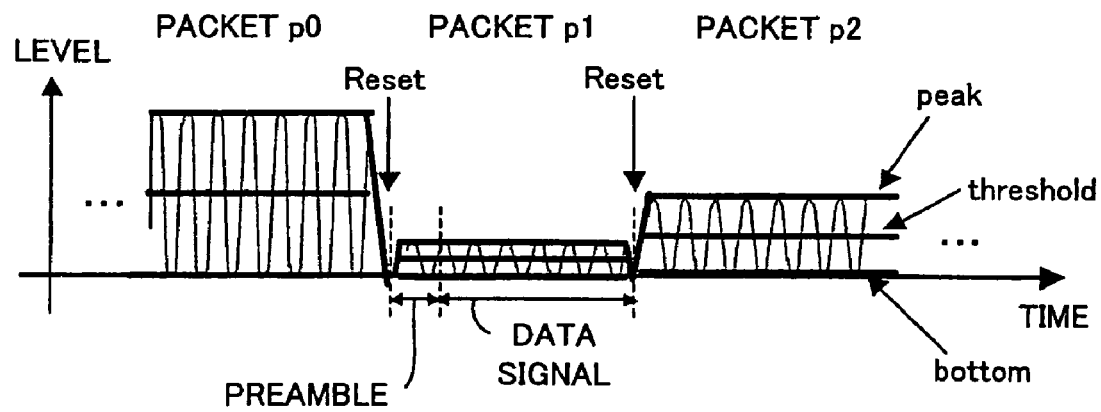
FIG. 16 is a view showing an overview of packet reception processing.
Figure 17:
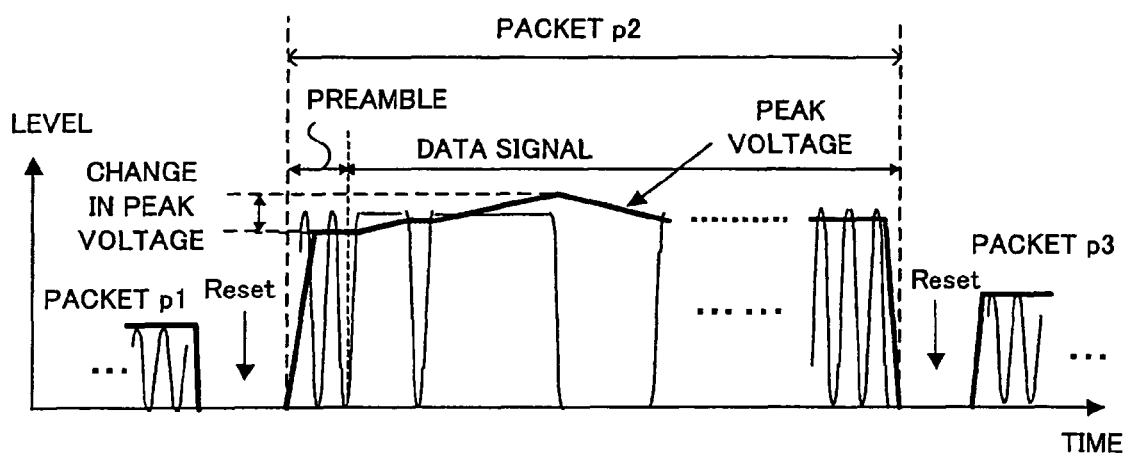
FIG. 17 is a view illustrating a problem.

An optical line terminal (OLT) containing the receiving apparatus 1 will be described next. FIG. 13 is a diagram showing the configuration of such an OLT 7. The OLT 7 includes an optical-electrical conversion block 71 and a packet reception processing block 72. The packet reception processing block 72 has the same configuration as the receiving apparatus 1 shown in FIG. 1, and its description will be omitted.

Optical packets sent from the ONUs #1 to #n in a burst are coupled by a star coupler 52 and sent to the OLT 7. The optical-electrical conversion block 71 converts the received optical packets to packets of an electrical signal, and the packets are then processed by the packet reception processing block 72.

In the configuration described above, the stop signal generated by the stop control block 30 is sent to both the peak voltage detection block 10 and the bottom voltage detection block 20 and stops the operations to detect the peak voltage and the bottom voltage after the peak voltage and the bottom voltage are detected from the preamble. The stop signal may be sent to either the peak voltage detection block 10 or the bottom voltage detection block 20 to stop the corresponding detection operation.

A receiving apparatus of the present invention generates a stop signal for stopping a peak voltage detection operation and a bottom voltage detection operation, stops the operations to detect the peak voltage and the bottom voltage when the stop signal is received at corresponding blocks, retains the peak voltage and the bottom voltage detected before the reception of the stop signal while the same packet is being received, and specifies a threshold level from the retained peak voltage and bottom voltage. Because the threshold level is derived from the constant peak voltage and bottom voltage, a change in threshold voltage can be suppressed while the same packet is being received even if the signal pattern of the input packet varies.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A receiving apparatus for performing reception processing on a signal transmitted in packets, the receiving apparatus comprising:
a peak voltage detection circuit to detect a peak voltage of the signal;
a bottom voltage detection circuit to detect a bottom voltage of the signal;
a stop control circuit to generate a stop signal for stopping the operation to detect the peak voltage and the operation to detect the bottom voltage; and
a threshold value output circuit to specify a threshold voltage derived from the peak voltage and the bottom voltage;
wherein the peak voltage detection circuit stops the operation to detect the peak voltage at reception of the stop signal, and retains the peak voltage of a preamble of the signal detected before the reception of the stop signal;
the bottom voltage detection circuit stops the operation to detect the bottom voltage at reception of the stop signal, and retains the bottom voltage of a preamble of the signal detected before the reception of the stop signal; and
the threshold value output circuit specifies that the threshold voltage derived from the peak voltage and the bottom voltage is kept constant while the signal is being received;
(a) wherein the peak voltage detection circuit includes:
a first transistor which passes the signal; and
a first capacitor which is charged to hold the peak voltage; and
when the peak voltage detection circuit receives the stop signal, a gate voltage of the first transistor is changed to suppress a leak current from occurring in the first transistor based on a voltage of the stop signal and a voltage of an input-side terminal of the first transistor, causing the peak voltage of the preamble of the signal detected before the reception of the stop signal to be retained; and
(b) wherein the bottom voltage detection circuit includes:
a second transistor which passes the signal;
a second capacitor which is charged to hold the bottom voltage; and
when the bottom voltage detection circuit receives the stop signal, a gate voltage of the second transistor is changed to suppress a leak current from occurring in the second transistor based on a voltage of the stop signal and a voltage of an input-side terminal of the second transistor, causing the bottom voltage of the preamble of the signal detected before the reception of the stop signal to be retained.

2. The receiving apparatus according to claim 1, wherein the stop control circuit outputs the stop signal, which is a difference between the peak voltage, which is detected by the peak voltage detection circuit from an amplitude level of the preamble of the signal, and the bottom voltage, which is detected by the bottom voltage detection circuit from the amplitude level of the preamble of the signal.

3. The receiving apparatus according to claim 1, further comprising a delay circuit to delay the stop signal in order to adjust the time at which the stop signal is input to the peak voltage detection circuit and the bottom voltage detection circuit.

4. An optical line terminal located on a side of a local exchange of an optical fiber subscriber network, the optical line terminal comprising:
an optical-electrical conversion circuit to receive optical packet signals sent in a burst from the subscriber side and convert each of the optical packet signals to a packet of an electrical signal; and
a packet reception processing circuit, including:
a peak voltage detection circuit to detect a peak voltage of the packet;
a bottom voltage detection circuit to detect a bottom voltage of the packet;

a stop control circuit to generate a stop signal for stopping the operation to detect the peak voltage and the operation to detect the bottom voltage; and a threshold value output circuit to specify a threshold voltage derived from the peak voltage and the bottom voltage;

wherein the peak voltage detection circuit stops the operation to detect the peak voltage at reception of the stop signal, and retains the peak voltage of a preamble of the packet detected before the reception of the stop signal;

the bottom voltage detection circuit stops the operation to detect the bottom voltage at reception of the stop signal, and retains the bottom voltage a preamble of the packet detected before the reception of the stop signal; and the threshold value output circuit specifies the threshold voltage derived from the peak voltage and the bottom voltage is kept constant while the packet is being received;

(a) wherein the peak voltage detection circuit includes:

a first transistor which passes the signal; and a first capacitor which is charged to hold the peak voltage; and when the peak voltage detection circuit receives the stop signal, a gate voltage of the first transistor is changed to suppress a leak current from occurring in the first transistor based on a voltage of the stop signal and a voltage of an input-side terminal of the first transistor, causing the peak voltage of the preamble of the packet detected before the reception of the stop signal to be retained; and (b) wherein the bottom voltage detection circuit includes:

a second transistor which passes the electrical signal; and a second capacitor which is charged to hold the bottom voltage; and when the bottom voltage detection circuit receives the stop signal, a gate voltage of the second transistor is changed to suppress a leak current from occurring in the second transistor based on a voltage of the stop signal and a voltage of an input-side terminal of the second transistor, causing the bottom voltage of the preamble of the packet detected before the reception of the stop signal to be retained.

* * * * *